Feb. 2, 1943.     H. H. VANE     2,309,809
GEOMETRICAL INSTRUMENT
Filed May 26, 1941     2 Sheets-Sheet 1
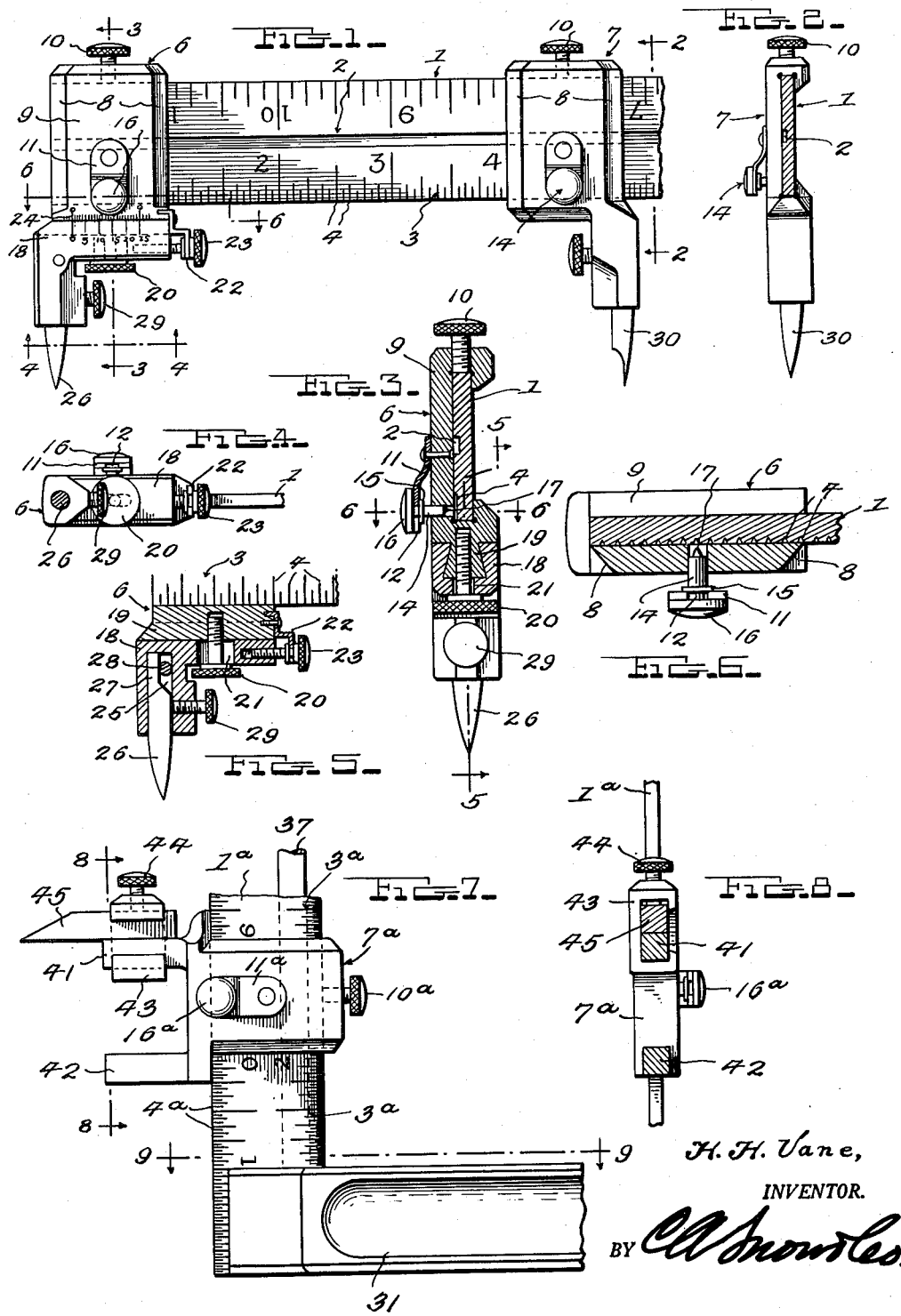
H. H. Vane,
INVENTOR.

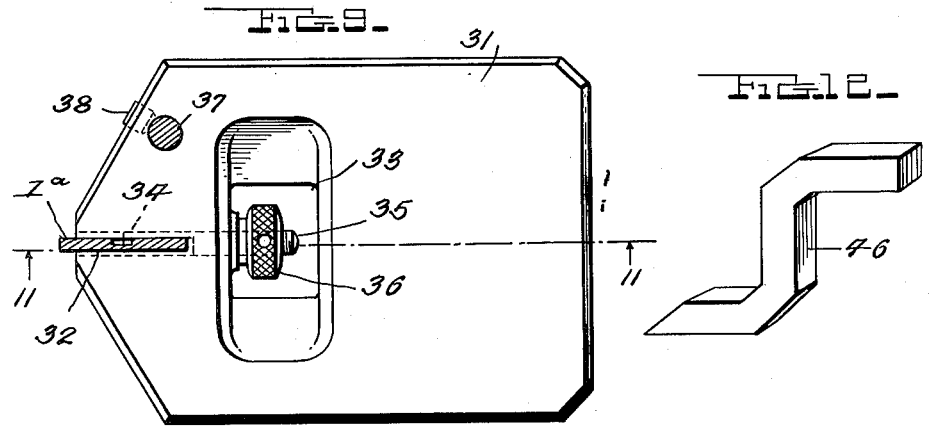
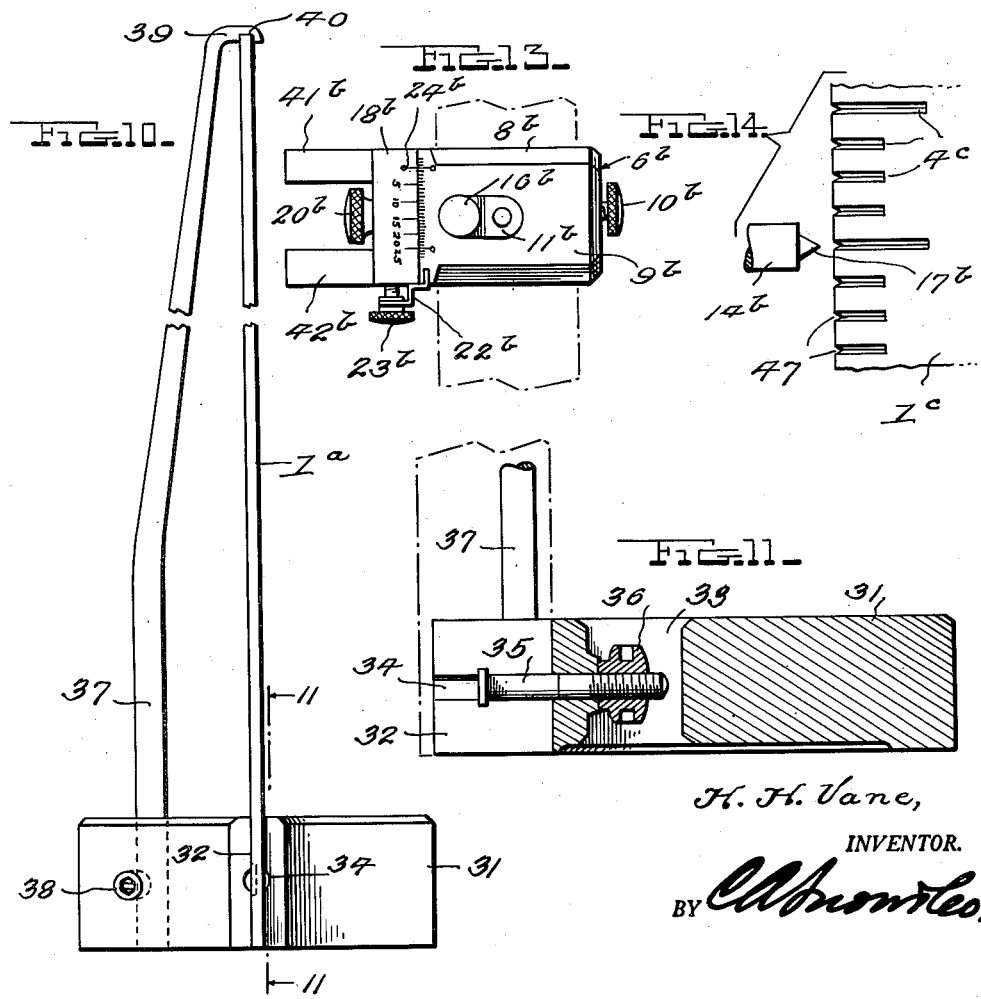

Patented Feb. 2, 1943

2,309,809

UNITED STATES PATENT OFFICE 2,309,809

GEOMETRICAL INSTRUMENT

Howard Hollis Vane, Cincinnati, Ohio

Application May 26, 1941, Serial No. 395,289

2 Claims. (Cl. 33—158)

This invention relates to instruments of that general sort which employ a beam, and one or more riders slidably adjustable along the beam, it being necessary that the distance between the "fingers" of the riders be determined accurately. Of such instruments, beam compasses, calipers, dividers, surface gauges, and height gauges, are illustrative examples.

The invention aims to supply a novel means whereby the distance between the "fingers" of the riders may be determined accurately, quickly, and without eye-strain, a novel means being provided for bisecting the width of the scale markings of the beam, in the interest of extreme accuracy in determining the distances between the "fingers." The word "finger" is used as a generic term, covering elements which leave a mark, as in a compass, and only those which do not, as in an instrument employed only to determine the distance between two points.

A further object of the invention is to provide novel means whereby the finger on the rider can be located to a fraction of the distance which exists between adjacent graduations of the scale of the beam.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a device constructed in accordance with the invention;

Figs. 2, 3 and 4 are sections taken, respectively, on the lines 2—2, 3—3 and 4—4 of Fig. 1;

Fig. 5 is a section through parts of one rider, portions remaining in elevation;

Fig. 6 is a section on the line 6—6 of Fig. 1;

Fig. 7 is a side elevation showing a modification, parts being broken away;

Figs. 8 and 9 are sections taken, respectively, on the lines 8—8 and 9—9 of Fig. 7;

Fig. 10 is an elevation of the structure delineated in Fig. 7, parts being omitted;

Fig. 11 is a section on the line 11—11 of Fig. 10;

Fig. 12 is a perspective showing a gauge that can be used with the device of Figs. 10 and 13;

Fig. 13 is an elevation of a modified rider for use with the device of Fig. 7;

Fig. 14 is a diagrammatic elevation dealing with modified scale markings.

The numeral 1 marks a beam, which may be a steel rule of ordinary commercial construction. The beam 1 is shown as having a longitudinal groove 2, employed during the fastening of the beam in certain types of handles (not shown). The groove 2 is not essential to the operation of the present invention, and may be dismissed from further consideration.

The beam 1 is supplied with any desired number of longitudinal scales 3, but one of which need be discussed. The graduations of the scale 3 are in the form of shallow grooves 4 (Fig. 6), which are V-shaped in cross section.

A first rider 6 and a second rider 7 are mounted on the beam 1, for adjustment longitudinally thereon. Wherever necessary, the constituent elements of the riders 6 and 7 are beveled, as shown at 8, to afford a clear sight.

Referring to the first rider 6, that rider is shown as comprising a body 9, open at one side, and receiving the beam 1, to the end that the rider may be adjusted longitudinally of the beam. A set screw 10 is threaded into the body 9 and engages the edge of the beam 1, to hold the body in any position to which it may have been adjusted, along the beam.

An offset spring tongue 11 is secured at one end to one side of the rider body 9. A notch 12 is formed in the lower end of the tongue 11. A plunger 14 is mounted in the rider body 9 for rotation and for longitudinal sliding movement, the plunger being received for rotation in the notch 12 of the tongue 11. The plunger 14 is supplied with a circumscribing shoulder 15, and has a button 16 at its outer end. The free end of the spring tongue 11 is received between the shoulder 15 and the button 16, and, therefore, the plunger 14 does not have longitudinal movement in the tongue 11. At its inner end, the plunger 14 is supplied with a conical tip 17.

The rider 6 may be disposed with the outer edge of the body 9 coincident with one end surface of the beam 1, as shown in Fig. 6. The rider 6 can be located accurately in the position specified, or in any other position along the beam 1, by pushing in the plunger 14, until the conical tip 17 enters the appropriate one of the V-shaped grooves 4 of the scale 3.

When the tip 17 of the plunger 14 enters the groove 4, the plunger 14 may be rotated by way of the button 16, thereby causing the tip 17 to dislodge any particles of dirt that may be lodged in the groove. An accurate positioning of the rider 6 and associated parts thus is attained. The rider 6 will be positioned properly, even though the grooves 4 do not happen to be of exactly the same depth.

When pressure on the plunger button 16 is relieved, the plunger 14 moves outwardly, under the impulse of the spring tongue 11. The conical tip 17 of the plunger 14 is retracted into the body 9 of the rider, as in Fig. 6, the integrity of the tip 17 is maintained, the scale 3 is not marred by the tip, and the rider may be adjusted readily along the beam 1.

As thus far described, the device includes means whereby the rider 6 may be positioned by steps the length of which is determined by the distance between adjoining scale grooves 4. A means is provided whereby the finger 26 can be located by fractions of the distance between adjoining grooves 4.

The rider 6 includes an L-shaped slide 18, embodying a longitudinal arm and a depending transverse arm. The longitudinal arm of the slide 18 is dovetailed at 19 upon the body 9 of the rider 6, for sliding adjustment therealong and lengthwise of the beam 1. In order to hold the slide 18 in any position to which it has been adjusted as aforesaid, a binding screw 20 is threaded into the body 9, the head of the screw engaging the longitudinal arm of the slide 18, said arm having an elongated slot 21, receiving a portion of the screw, and permitting relative movement between the slide 18 and the body 9 of the rider when the screw is slacked away.

As to the means whereby the slide 18 is adjusted with respect to the body 9 of the rider 6, longitudinally of the beam 1, an offset bracket 22 is secured to the body 9 of the rider 6, a feed screw 23 being held in the bracket for rotation, but against longitudinal movement, the feed screw being threaded into the longitudinal arm of the slide 18. The position of the rider 6 is determined by the engagement of the tip 17 of the plunger 14 in one of the scale notches 4. The body 9 of the rider 6 and the longitudinal arm of the slide 18 are supplied with a vernier 24, so calibrated that, when the feed screw 23 is rotated, the position of the slide 18 relatively to the rider 6 can be determined to fractions of the distance between adjoining scale grooves 4. The vernier 24 may read as closely as practical methods of calibration permit.

The depending transverse arm of the slide 18 is provided with a bore 25, in which a finger 26 is mounted removably, the definition of the word "finger" having been set forth hereinbefore. The finger 26 is provided with a reduced end 27, the flat side of which is adapted to engage a cross pin 28 in the slide, to prevent the finger 26 from rotating on its axis. The finger 26 is held in place, against longitudinal displacement, by a set screw 29, threaded into the depending transverse arm of the slide 18.

The second rider 7 is constructed like the first rider 6, aside from the fact that the rider 7 is of one-piece construction, the vernier 24 preferably being omitted. The finger 30 of the rider 7 is fashioned with regard to the work which it is to perform.

The rider 7 is located by a proper manipulation of its plunger 14, as hereinbefore explained in connection with the rider 6, the rider 7 being held in adjusted position by tightening the corresponding set screw 10. The rider 6 is grossly positioned in the same way, but a fine adjustment may be obtained by manipulating the feed screw 29, a reading on the vernier 24 being taken.

Since the depending arm of the slide 18 is outwardly offset with respect to the outer end surface of the body 9, and since the rider 7 has a corresponding feature, the fingers 26 and 30 are so positioned that the scale 3 may be employed throughout its entire length. If the distance to be determined is very short, the riders 6 and 7 may be removed from the beam 1 reversed about axes at right angles to the length of the beam 1, and restored to the beam. Under such circumstances, the fingers 26 and 30 may be brought closer together than would be possible otherwise. The tool may be employed, among other uses, as an inside or an outside caliper. The outer edges of the depending arm of the slide 18 and of the corresponding part of the rider 7 then coming into play.

Referring to the form shown in Figs. 7 to 12, parts hereinbefore described are designated by numerals already used, with the suffix "a."

In this form of the invention, there is provided a base 31, supplied in one end with a vertical slot 32, there being an opening 33 in the base, inwardly of the slot. The base 31 is provided with a bore 34, intersected by the slot 32. The beam 1a is mounted upright in the slot 32 and is held therein by a draw bolt 35, actuated by a nut 36 disposed in the opening 33.

If desired, but not of necessity, the beam 1a is reenforced by a brace 37, the lower end of which is received in an opening in the base 31, the brace being held in place by a set screw 38, threaded into the base. At its upper end, the brace 37 has a transverse arm 39, provided with a seat 40 for the reception of the upper end of the beam 1a.

The rider 7a, which is mounted to slide on the beam 1a, is supplied with an upper transverse projection 41 and with a lower transverse projection 42. An open-sided clamp 43, including a set screw 44, is removably mounted on the upper projection 41 and retains thereon a gauge 45. There may be any desired number of the gauges 45, and they vary in thickness by so little as one-thousandth of an inch, if desired. The structure is adapted to be used, for instance, as a depth gauge for measuring vertical heights between the lower surface of the base 31 and the lower surface of the part 45.

Noting Fig. 12, there is provided an approximately Z-shaped gauge 46, which can be held on the projection 42 by means of the clamp 43. The part 46 is useful when the depth to be measured is so small that it is necessary to provide a part which is extended downwardly below the level of the upper surface of the base 31.

Noting Fig. 13, parts hereinbefore described have been designated by numerals already used, with the suffix "b." In this form of the invention, the rider 6b is provided with arms 41b and 42b, duplicating in function the arms 41 and 42 of Fig. 7. The rider 6b is a composite structure, including a body 9b, a slide 18b, and mechanism for moving the slide, as set forth in connection with the form depicted in Fig. 1.

Figure 14 shows that the graduation grooves 47 may be disposed in the edge of the beam 1c, as well as elsewhere.

What is claimed is:

1. A geometrical instrument comprising a beam having V-shaped calibration grooves, a rider adjustable along the beam, a plunger slidable on the rider and comprising a pointed tip shaped to enter closely into each groove, a working-finger carried by the rider, and spring means engaged with the plunger and normally retracting the plunger, to house the tip within the rider.

2. A geometrical instrument comprising a beam having V-shaped calibration grooves, a rider adjustable along the beam, a plunger slidable on the rider and comprising a pointed tip shaped to enter closely into each groove, a spring tongue having one end portion secured to the rider, the opposite end portion of the tongue being offset from the rider and having a notch which opens through the extremity of said opposite end portion, the plunger passing through the notch, a button at the outer end of the plunger, the plunger having a shoulder spaced from the button, said opposite end portion being received closely between the button and the shoulder, the tongue constituting yieldable means normally retracting the plunger, to house the tip within the rider, and a working-finger carried by the rider.

HOWARD HOLLIS VANE.